(12) United States Patent
López Villarroel et al.

(10) Patent No.: US 11,657,213 B2
(45) Date of Patent: May 23, 2023

(54) SYSTEM AND METHODS THAT ADD FUNCTIONALITIES TO PRESENTATION SYSTEMS SO THAT TEXTS AND NUMBERS BE REMOTELY INSERTED, EDITED AND DELETED FROM MOBILE DEVICES DIRECTLY INTO SLIDEWARE SLIDE SHOW MODE (ISLIDESMOBILE)

(71) Applicant: UNIVERSIDAD DE SANTIAGO DE CHILE, Santiago (CL)

(72) Inventors: Mario López Villarroel, Santiago (CL); Héctor Ponce Arias, Santiago (CL)

(73) Assignee: UNIVERSIDAD DE SANTIAGO DE CHILE, Santiago (CL)

( * ) Notice: Subject to any disclaimer, the term of this patent is extended or adjusted under 35 U.S.C. 154(b) by 0 days.

(21) Appl. No.: 17/238,101

(22) Filed: Apr. 22, 2021

(65) Prior Publication Data
US 2022/0343057 A1    Oct. 27, 2022

(51) Int. Cl.
*G06F 40/166*    (2020.01)
*H04L 65/401*    (2022.01)
(Continued)

(52) U.S. Cl.
CPC .......... *G06F 40/166* (2020.01); *G06F 40/103* (2020.01); *H04L 65/4015* (2013.01); *H04M 1/72406* (2021.01)

(58) Field of Classification Search
CPC . G06F 40/166; G06F 40/103; H04L 65/4015; H04M 1/72406
See application file for complete search history.

(56) References Cited

U.S. PATENT DOCUMENTS

| | | | |
|---|---|---|---|
| 8,225,335 B2* | 7/2012 | Glenner | H04L 65/60 719/322 |
| 8,402,391 B1* | 3/2013 | Doray | G06F 3/0481 715/834 |
| 9,154,531 B2* | 10/2015 | Kashi | H04L 65/4038 |

(Continued)

FOREIGN PATENT DOCUMENTS

| | | |
|---|---|---|
| CA | 2894662 | 6/2014 |
| WO | WO 2010/149926 | 12/2010 |

*Primary Examiner* — Ryan F Pitaro
(74) *Attorney, Agent, or Firm* — Intellectual Property Law Group LLP

(57) ABSTRACT

The iSlidesMobile system and methods adds POWER-POINT functionalities for text objects and numerical data be inserted (sent), edited, and deleted remotely from mobile devices directly into POWERPOINT Slide Show mode. In brief, POWERPOINT presenters a) control their POWERPOINT presentation through starting and ending presentations, moving slides forward or back, and skipping slides forward or back; and b) edit the interactive slides (iSlides) included in the POWERPOINT presentation via adding, editing, and removing text objects; and perform interactive events for audience members voluntarily participation. Additionally, audience members a) follow intuitively the presentation since slides titles are listed on the mobile's screen, and b) voluntarily participate in the edition of the iSlides that the presenter has on POWERPOINT Slide Show display via sending, editing, and deleting own text objects as well as sending numerical data.

24 Claims, 12 Drawing Sheets

(51) Int. Cl.
   *G06F 40/103* (2020.01)
   *H04M 1/72406* (2021.01)

(56) References Cited

U.S. PATENT DOCUMENTS

| | | | | |
|---|---|---|---|---|
| 10,019,424 B2* | 7/2018 | Lopez | | G06F 8/61 |
| 11,295,511 B1* | 4/2022 | Yosifov | | G06T 11/206 |
| 2003/0034999 A1* | 2/2003 | Coughlin, III | | G09B 7/00 |
| | | | | 715/738 |
| 2007/0052937 A1* | 3/2007 | Savilampi | | G03B 21/00 |
| | | | | 353/121 |
| 2013/0041938 A1* | 2/2013 | Lin | | H04N 21/4782 |
| | | | | 709/203 |
| 2014/0258869 A1* | 9/2014 | Thomas | | G06Q 30/0241 |
| | | | | 715/731 |
| 2014/0281855 A1* | 9/2014 | Bhatnagar | | G06F 16/9554 |
| | | | | 715/205 |
| 2015/0121189 A1* | 4/2015 | Titterington | | G06F 3/04847 |
| | | | | 715/230 |
| 2015/0138213 A1* | 5/2015 | Turner | | G06F 3/04817 |
| | | | | 345/520 |
| 2015/0350269 A1* | 12/2015 | Shibata | | G06F 3/0483 |
| | | | | 715/202 |
| 2016/0050504 A1* | 2/2016 | Browne | | H04R 27/00 |
| | | | | 381/66 |
| 2016/0188125 A1* | 6/2016 | Kaplan | | G06F 40/169 |
| | | | | 715/730 |
| 2018/0322099 A1* | 11/2018 | Vembu | | H04L 51/10 |
| 2019/0281349 A1* | 9/2019 | Harkness | | G10L 19/018 |
| 2020/0021453 A1* | 1/2020 | Advani | | H04H 60/33 |
| 2020/0104092 A1* | 4/2020 | Cohen | | G06F 3/0482 |
| 2020/0106813 A1* | 4/2020 | Vendrow | | H04L 65/4015 |
| 2020/0329079 A1* | 10/2020 | Yan | | H04L 65/4015 |
| 2021/0076105 A1* | 3/2021 | Parmar | | G06F 3/0425 |
| 2021/0397331 A1* | 12/2021 | Thomas | | G06F 16/4393 |

* cited by examiner

SYSTEM AND METHODS THAT ADD FUNCTIONALITIES TO PRESENTATION SYSTEMS SO THAT TEXTS AND NUMBERS BE REMOTELY INSERTED, EDITED AND DELETED FROM MOBILE DEVICES DIRECTLY INTO SLIDEWARE SLIDE SHOW MODE (ISLIDESMOBILE)

FIELD OF THE INVENTION

The invention of the present application (iSlidesMobile) is related to the presentation software POWERPOINT, to U.S. Pat. No. 10,019,424, and to POWERPOINT users' frustrations.

iSlidesMobile invention relates to POWERPOINT, part of Microsoft Office that packs several personal productivity tools, and which has 1.2B licenses sold worldwide (Keizer, 2017). The invention also relates to the system and method iSlides, U.S. Pat. No. 10,019,424 (Lopez, 2018) that added three functionalities to POWERPOINT: a new iSLIDES tab inserted into POWERPOINT main ribbon, new interactive slides (iSlides) inserted into its design pane, and iSlides whose texts and objects are editable, resizable, movable, and formattable in POWERPOINT Slide Show mode.

POWERPOINT dates from the 1980s, when the dominant presentation paradigm was an active presenter and a passive audience. Since then, the paradigm changed into active presenter and audience. Presenters began introducing interactive events into their presentations, mainly through engaging audiences by asking questions, brainstorming and other audience participation techniques (Steuer, 1992; Liu, 2002). To accomplish their interactive events, presenters had to break the presentation steadiness and, to write audience answers, they usually left the presentation and moved on to a white board, a flipchart, or other software. Thus, POWERPOINT became misaligned with the evolved paradigm. The iSlides technology solved the misalignment since it allowed capturing audience contributions directly into POWERPOINT Slide Show mode. However, presenters and audiences had other unsolved frustrations. To capture audience contributions, presenters feel compelled to stay by the keyboard to write their audiences inputs. As the number of audience members participating was large, most wishing that their contributions were also considered, felt frustrated because presenters did not select their inputs. Additionally, a third frustration arose: not all contributions from the audience can be displayed if they are more numerous than required for proper deployment in projection time.

The iSlidesMobile system and methods, and their associated services, overcome these frustrations, since they allow remote sending, editing, and deleting text objects and numeric data from mobile devices. The iSlidesMobile system and methods associated services are two Web Add-ins for POWERPOINT and data managing, processing, and communicating services.

BACKGROUND OF THE INVENTION

State of the Art

The state of the art is reviewed in terms of searches into the literature, commercially available software and applied and granted patents.
a) Research and Development Literature The literature confirms that POWERPOINT is a universally used tool. Savoy (2009, 258) argues that "POWERPOINT is a software tool that has become a presentation staple in lecture halls, conference rooms, and computer-based training". Poortema (2007) states that there is little research about POWERPOINT uses in business, analyzes a case study in management and concludes that POWERPOINT is the most used tool in offices and that supporting presentations at meetings is the prime usage. Guerney (2001) reports that 69% of teachers from kindergarten to 12th grade use POWERPOINT. Chia-Li (2015) showed that POWERPOINT is the most frequently used technology in college classrooms. Schrad (2010) stated that PowerPoint has become the norm in large university lecture classes.

The literature also reports on POWERPOINT significant uses. Chan (2016) describes that POWERPOINT is an assumed tool in business since entrepreneurs pursue investors for a meeting to ask financing through a short POWERPOINT presentation. Chou (2015) experimentally evaluated knowledge acquisition through using POWERPOINT and Prezi. He organized three treatment groups: POWERPOINT, Prezi, and traditional instructions. The results showed that instruction with POWERPOINT and Prezi was more effective compared with traditional instruction. Idem for conferences, Cox (2011) describes the usefulness of introducing embedded YouTube videos directly into POWERPOINT for conferencing.

Presenters to provide support to their interactive events began looking for alternative technologies, specifically for audience response systems. Harper (2009) reports the use of TurningPoint, a POWERPOINT Add-in, which uses an external server to display audience's vote or question answers. Dasa (2015) reports the use of Poll Everywhere, another POWERPOINT Add-in that displays audience voting using external services. Gokbulut (2020) reports that Kahoot and Mentimeter had a positive impact on teacher training students.

POWERPOINT has strong detractors. Gallo (2018) reports that Amazon's CEO banned POWERPOINT in meetings because stories are more persuasive than bullet point. Schrad (2010) shows that POWERPOINT exhibits low effectiveness level compared to other interactive methods. Shah (2012) uses POWERPOINT to present content and display questions during questions and answers sessions and uses other platforms to perform interactive events. Bumiller (2010, pA1) reports that General McChrystal, US and NATO forces in Afghanistan leader, when he saw a PowerPoint slide that modelled the complexity of the US military strategy, but looked more as a spaghetti dish, he said "When we understand that slide, we will have won the war".
b) Commercially Available Software.

Internet searches showed that there are many POWERPOINT template suppliers. Some of them are Crystal Graphics, SmartDraw, Inspiration, and Free PowerPoint Templates. Crystal Graphics makes available templates, video backgrounds, pictures, charts, and diagrams, 3D character slides; and background music tracks ("Crystal Graphics", n.d.). SmartDraw offers thousands of templates which may be filled in online and exported as image PowerPoint slides ("Smart Draw", n.d.). Inspiration Software Inc. provides visual support for graphic organizers, concept mapping, mind mapping, webbing, out-lining, and graphs. All visual productions are transferable as image PowerPoint slides ("Inspiration", n.d.). Free POWERPOINT Templates offers pre-made free templates under various categories, i.e. business/finance, abstract, objects, people, medicine/health, flowers, nature, education, and many others. Download gives access to a compress file with presentation file including one or more slides with one or more templates ("Free POWERPOINT Templates", n.d.).

Internet searches also showed that there is an increasing number of audience response systems. Compton (2018) reviews seven of such systems, while Kubica (2019) reports over fifty of these systems. Our search gave fifteen software systems with certain proximity to what is claimed here. The systems are Poll Everywhere, Slido, Kahoot, Mentimeter, MeetingPulse, Beekast, Wooclap, DirectPoll, AhaSlides, Glisser, Ombea, Conferences i/o, Turning point, Participoll, Vevox. Closer examination filtered Poll Everywhere, Slido, Turning point, and Vevox as the more interesting ones.

Poll Everywhere is an audience voting platform. Via Web or SMS texting, Poll Everywhere captures polling, and answers and displays them graphically. The display may be done in POWERPOINT as a web page through an Add-ins ("Poll Everywhere", n.d.). Slido is a Web-based platform for live audience interaction, through question/answer activities (voice and text) and surveys/voting. It enables participants to use their cell phones to speak and be heard on the presenter's PC. It may be integrated with POWERPOINT through a specialized application ("Slido", n.d.). Turning Point is an audience engagement platform. It includes interactive live surveys. Focused on teaching/learning activities, its purpose is to increase participation, support active learning, and help improve student success. It may be integrated into POWERPOINT through the Turning Point VSTO add-in ("Turning Technologies", n.d.). Vevox is a web-based application and platform for running interactive live surveys. It includes an advanced add-in for POWERPOINT that allows adding and managing questions (multiple choice, word cloud, or "rating") directly on PowerPoint slides. Focused on voting activities, it may be integrated and managed from POWERPOINT through the Vevox VSTO add-in ("Vevox", n.d.).

c) Patents

Using a semantic strategy, with U.S. Pat. No. 10,019,424 as a base, and searching with PatSnap software, there were 999 documents found. 818 of these were in the United States of America register, 76 in WIPO's, 48 in China's, 22 in EPO's, 18 in Korea's, and the remainder 17 in 9 other registers. Further filters count down documents according to keywords as follows: Presentation provided 539 entries; Presentation slide gave 22; PowerPoint 16; Mobile device 6; PowerPoint slide show 2; Presentation and mobile device 5; Interaction 2. The closest documents were application WO 2010/149926 and patents CA 2,894,662 A1, and U.S. Pat. No. 9,154,531 B2. The application WO 2010/149926 A1 focusses on how a presentation software, e.g., PowerPoint, and a mobile device exchange data via Bluetooth, to answer fixed answer questions. Patent CA 2,894,662 A1 stores a presentation (POWERPOINT or other) on a server and users remotely control the view of the presentation in response to user inputs. Patent U.S. Pat. No. 9,154,531 B2 is a framework that enables participants of audio or web conferences to submit questions without disturbing the ongoing conference; POWERPOINT may be one of external tools to display conference contents.

d) State of the Art Interim Conclusion

A thorough analyzes of research and development papers, commercial web sites, and applications and patents worldwide, found no documents in which, on the one hand, POWERPOINT presenters, not only teachers but also business executives and conference speakers, may from their mobile devices control the presentation and manage the interactive events, not only asking fixed answer questions but also asking open ended questions that require a short phrase as answer as well as invite audience participation on a variety of interactive slides (diagrams, charts, diagram sequences, polls, surveys, tests). On the other hand, POWERPOINT audience, not only students but also meeting attendants and conference assistants, may from their mobile devices, locally or remotely, follow the POWERPOINT slide titles and participate in the presenter's interactive events, not only responding fixed answer questions but also responding open ended questions that require a short phrase as answer as well as participate on a variety of interactive slides (diagrams, charts, diagram sequences, polls, surveys, tests).

BRIEF DESCRIPTION OF DRAWINGS

The drawings illustrate principles of the invention and, although not to scale, show relative dimensions.

SUMMARY OF THE INVENTION

Figure 1:
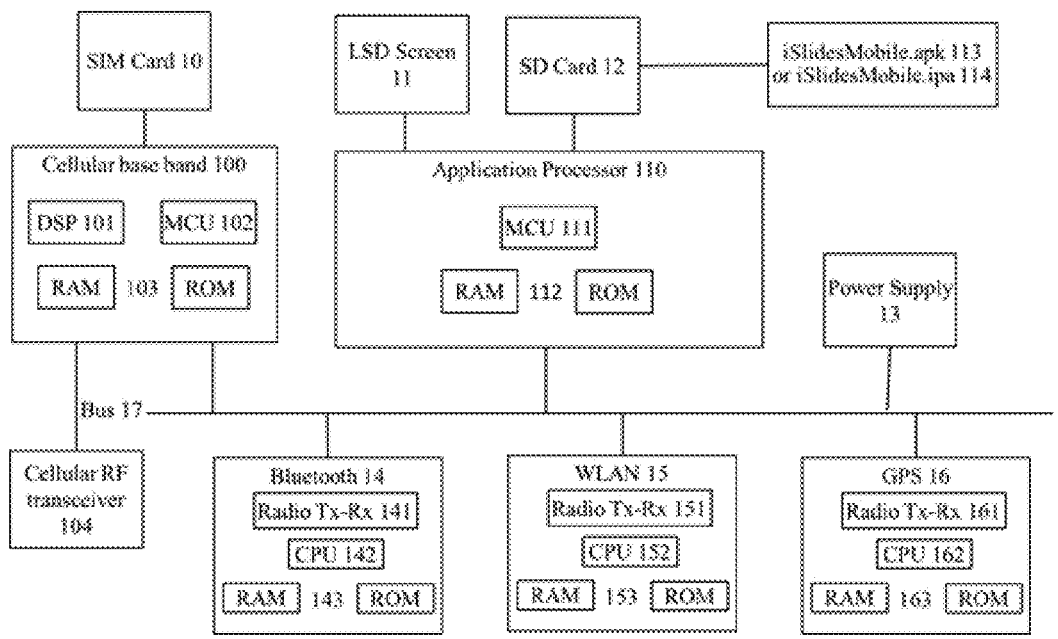
FIG. 1 is a typical mobile device (smartphone, tablets) block diagram depicting the system requirements for the iSlidesMobile system and methods App to be installed.

The iSlidesMobile system and methods invention is packed as .apk and .ipa files to be installed in mobile devices with Android 113 and iOS 114 operating systems, respectively. On one hand it adds a new functionality to POWERPOINT Slide Show mode 409, since it allows remote sending, editing, and deleting text objects and numeric data from mobile devices. On another hand, it solves POWERPOINT user-presenters 401 (i.e., meeting chairpersons; trainers, teachers, and lecturers; and conference speakers) and audience members 402 (i.e., meeting participants; trainees, pupils, and lecturers; and conference attendants) frustrations. To capture audience contributions, presenters must not stay by the keyboard to write their audiences inputs. Audience members may voluntarily and remotely send their contributions directly to POWERPOINT Slide Show mode. Furthermore, if the number of contributions, sent by audience members, surpluses screen's display capacity, contributions may externally be processed 405 to be shown as an affinity synthesis in POWERPOINT Slide Show mode.

The iSlidesMobile is a system and a set of methods. It is a system because it installs from the executable files iSlidesMobile.apk (for mobile devices based on the Android operating system 113) or iSlidesMobile.ipa (for mobile devices based on the iOS operating system 114). iSlidesMobile enhances POWERPOINT functionalities since it allows sending, editing, and deleting text objects in POWERPOINT Slide Show mode, remotely and directly from mobile device, and for either presential or Web meetings, classes, lectures, conference and other interactive or collaborative events. iSlidesMobile is a set of methods since POWERPOINT users (presenters and audience members) follow collection of steps to instantiate sending, editing, and deleting text objects and numerical data in POWERPOINT Slide Show mode.

iSlidesMobile provides POWERPOINT presenters' mobile devices with two functionalities to work remotely with POWERPOINT: control the presentation and set up and manage interactive slides in Slide Show mode. First, presenters may control their POWERPOINT presentation through launching 1332 and ending 1333 an open presentation, they may move slides forward 1334 or back 1331, as well as skip to non-adjacent slides forward or back 132. Second, to deploy interactive events with active and massive audience participation, iSlidesMobile provides presenters with tools to organize and manage four types of POWERPOINT inserted interactive slides (iSlides): text objects 142, poll 160, survey 190, and test 220. iSlidesMobile tools for text objects type of interactive slides include dialogs to send, edit, and delete text objects, as well as buttons to Start synthesis, for when the number of text objects exceed screen display capacity. For pool, survey, and test interactive slide types, iSlidesMobile tools contain buttons to set up the interactive event, such as name title, insert options/choices, and marking the right one. It also contains buttons to manage the interactive event, such as start/stop responses/votes, show/hide results, and show right response, if applicable.

iSlidesMobile provides POWERPOINT audience members' mobile devices with two functionalities to work remotely with POWERPOINT: follow presentation and enter interactive events and send text objects and numerical data directly to POWERPOINT Slide Show mode. iSlidesMobile provides audience members' mobile devices with Slide Selector interfaces that shows slides titles, allowing the audience to follow intuitively the presentation. To differentiate them, the interactive slides titles include a pencil icon and, pressing on them, audience members may enter the interactive slide to participate sending text or numerical messages. iSlidesMobile provides tools for audience voluntarily participate in the edition of the iSlides that the presenter has on POWERPOINT display via sending, editing, and deleting own text objects, and sending numerical data representing response choice or vote.

DETAILED DESCRIPTION OF SPECIFIC EMBODIMENTS

The system

The iSlidesMobile system works in whatever mobile device that supports software Apps. Such systems are mobile devices with Android and iOS operation systems. The iSlidesMobile system works independently from the host device configuration, which may vary from device to device.

The iSlidesMobile system purpose is to provide support to interactive events when POWERPOINT is used in meetings, classes, lectures, and conferences. It works jointly with one or more Add-ins Web previously installed in POWERPOINT, and cloud services for data management, processing, and communicating. These components make up the iSlidesMobile ecosystem. The iSlidesMobile system sends messages that get processed by the data services and passed them to the POWERPOINT's Contents Add-ins Web to be displayed in POWERPOINT Slide Show mode. The following FIGS. 1 to 10 illustrate the iSlidesMobile system and its technological environment.

FIG. 1 is a typical mobile device block diagram illustrating the system requirements for the iSlidesMobile App to be installed in a mobile device. Its basic components are cell phone 100, application processor 110, and network management 14, 15, 16. The cell phone baseband processor handles the cellular transmission through the subscriber identification module (SIM) 10, a microcontroller unit (MCU) 102, and a radio frequency transmitter and receiver (RF transceiver) 104. The application processor includes a microcontroller unit (MCU) 111 and associated RAM and ROM 112 as well as a LSD screen 11 and secured digital (SD) non-volatile memory card 12 for saving Apps such as iSlidesMobile.apk and iSlidesMobile.ipa for Android and iOS operating systems. The network management includes, among others, Bluetooth 14, WLAN 15, GPS 16. Each has radio transmitter and receiver, CPU, RAM, and ROM.

Figure 2:
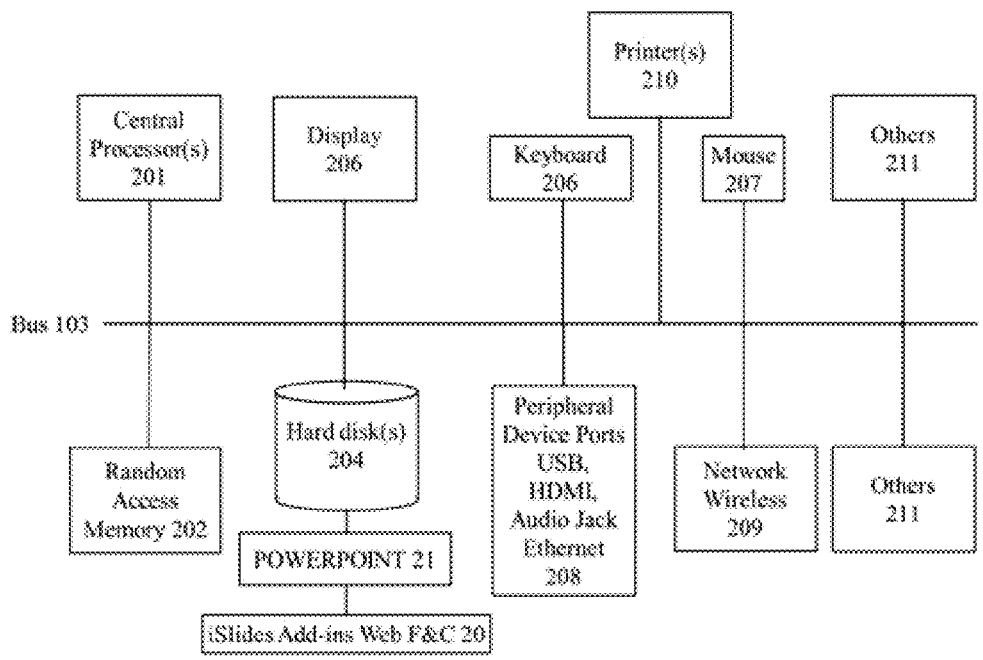
FIG. 2 is a typical desktop or laptop block diagram depicting the system requirements for the two Add-ins Web to be installed in MS POWERPOINT 2013, or later, or MS POWERPOINT 365 and POWERPOINT Online.

FIG. 2 is a typical desktop or laptop block diagram depicting the system requirements for the functionalities and contents Add-ins Web to be activated in MS POWERPOINT 2013, or later, or MS POWERPOINT 365 for either Windows or MacOS operating systems. The block diagram represents a desktop or laptop system, which the invention feeds with data messages. The block diagram has a central processor unit 201, a random access memory 202 and an internal bus 203, this latter connects all computer components. The system also includes hard disk(s) 204, display unit 205, keyboard 206 and mouse 2107. Further, the system may likewise comprise ports for peripheral devices connection 208 such as audio jack, Ethernet, USB, HDMI, and others, Wi-Fi network connectivity 209, printer(s) 210 and other devices 211. The most relevant element for the invention to work is the installation of the functionalities Add-ins Web and content Add-ins Web software. The latter passes the messages for POWERPOINT to display in its Slide Show mode.

Figure 3:
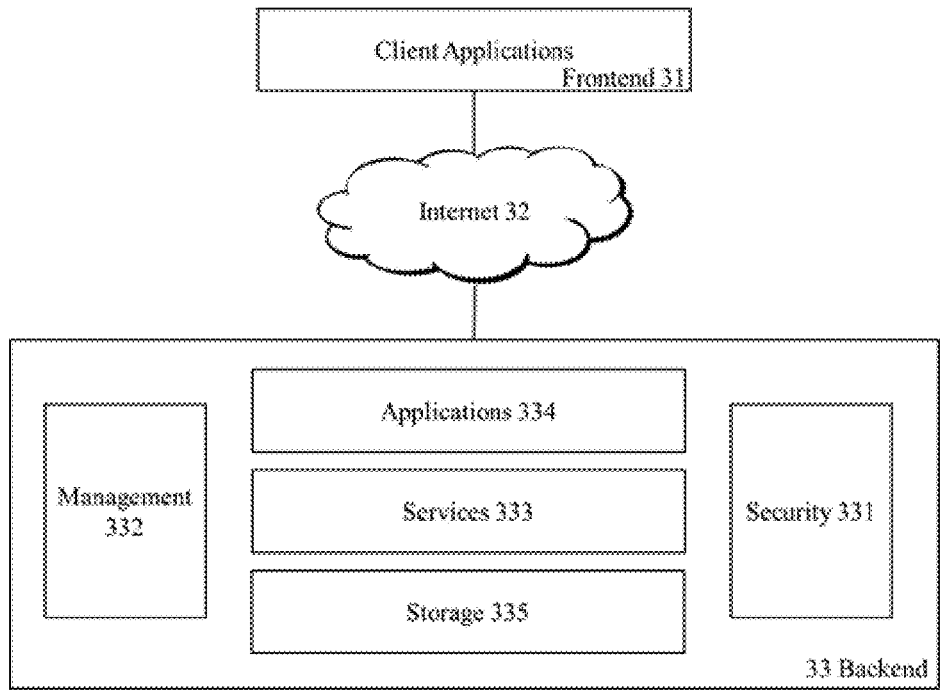
FIG. 3 is a typical cloud computer server block diagram depicting the system requirements for the data communications, management, and processing services.

FIG. 3 is a typical computer server block diagram depicting the system requirements for the data communications, management, and processing services to be installed. Computer cloud service has three united components that are frontend, Internet, and backend. The frontend are the client applications 31 requiring the cloud services. The backend 33 provides the services with security 331 and management 332. The backend also houses services 333 such as the services for data management, processing and communications required by iSlidesMobile to send and edit objects and texts in POWERPOINT Slide Show mode. Frontend and backend exchange data through the Internet 32.

Figure 4:
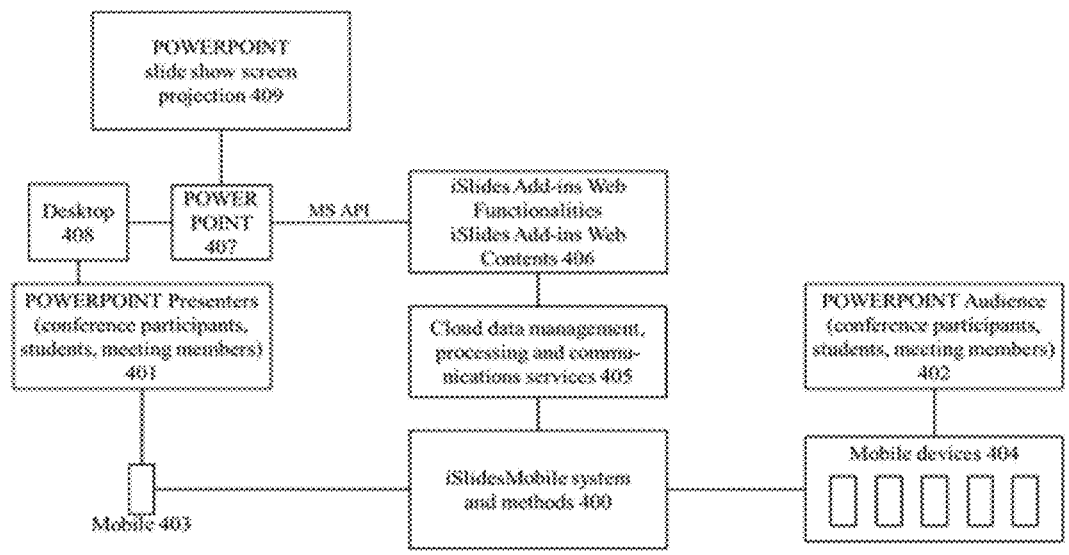
FIG. 4 is a block diagram representing the iSlidesMobile system and methods ecosystem and dialog with POWERPOINT Slide Show mode for remotely sending, editing, and deleting text objects and numerical data from presenter's PC and mobile device and audience's mobile devices.

FIG. 4 is a block diagram representing how the iSlidesMobile dialogs with POWERPOINT Slide Show mode and remotely send and edit objects and text from mobile devices presenter's and audience's mobile devices. The iSlidesMobile system and methods 400 handles (send and receives) remote messages originated, or for, presenters 401 and audience 402 mobile devices 403 and 404. The message passes forward and backward to the data management, processing, and communications services 405, where is operated according to parameters in their metadata. The communication service in 405 routes the message to the Contents iSlides Add-ins Web 406, which through Microsoft API 407 instruct the presentation software POWERPOINT 408, installed in presenters' desktop 409, to be displayed in POWERPOINT Slide Show mode 410.

Figure 5:
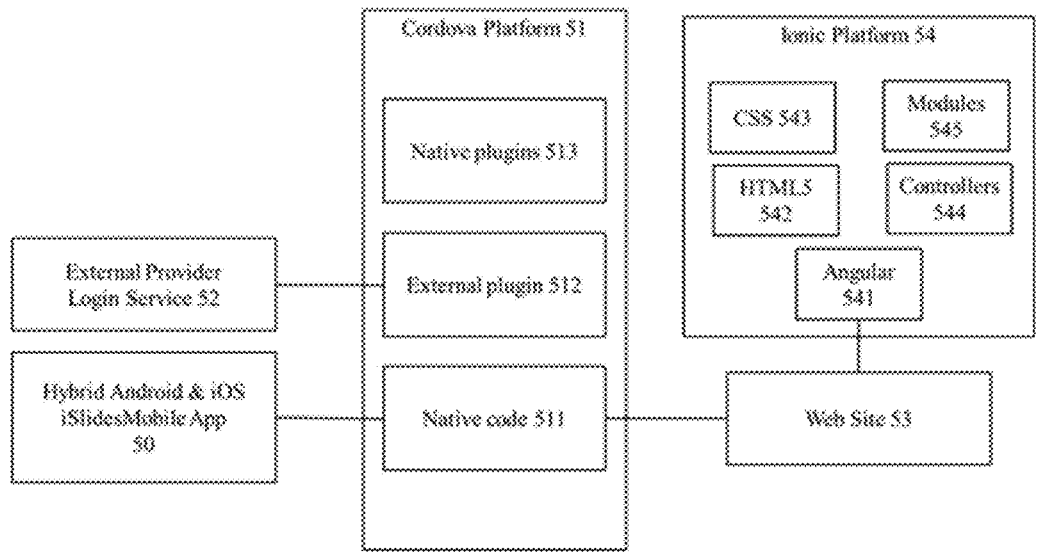
FIG. 5 is a block diagram describing the iSlidesMobile system detailed internal components structure.

FIG. 5 is a block diagram describing the iSlidesMobile system internal components structure. The iSlidesMobile 50 is a hybrid App for Android and iOS mobile devices operating systems. It was built through the Cordova platform 51. Programming 511 produced a Web site 53, through the Ionic platform 54, giving access to Angular framework 541, giving access to HTML5 542 and other programming resources 543, 544 and 545. The Cordova platform also gave access to an external plugin 512 to manage App authentication through an external login service.

Figure 6:
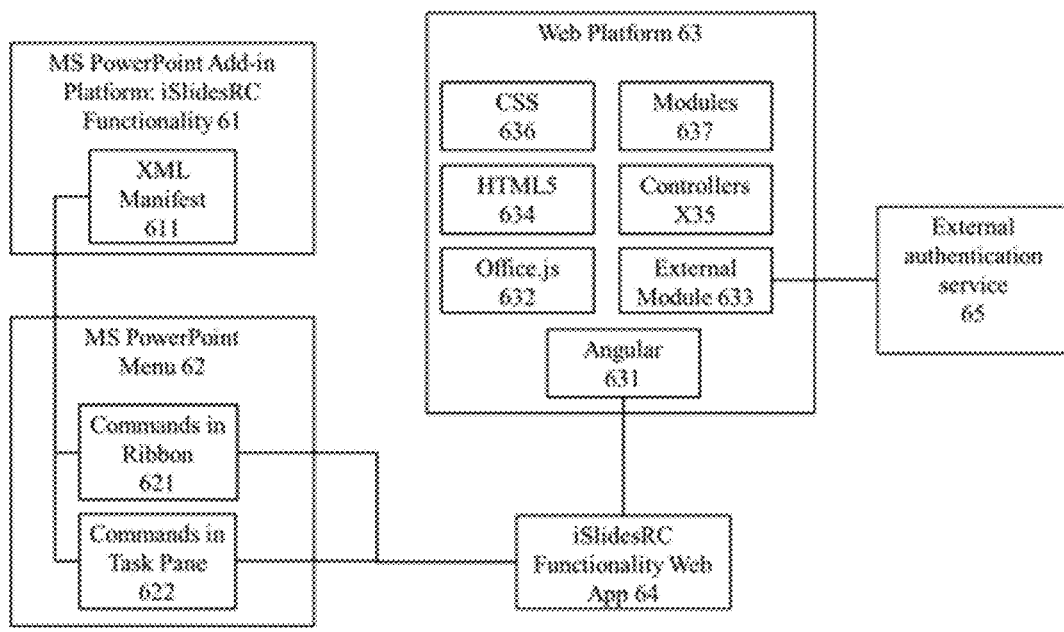
FIG. 6 is a block diagram describing the Functionality Web Add-ins for POWERPOINT system internal components structure.

FIG. 6 is the Add-ins Functionality system 61 that consists of the XML Manifest 611 and the functionality Web App 64. The Manifest defines the insertion into MS POWERPOINT 62 of the iSlides command ribbon 621 and the iSlides Task Pane 622, which are displayed in design mode depending on the POWERPOINT version. Commands are executed through the Web App of functionalities 64. The Web App features are available as a Web platform 63, which uses Angular framework 631, through HTML5 634, CSS 636, and other web technologies, including Controllers 635, Modules 637, JavaScript Framework for Office, Office.js 632, and the connection module for the use of an external 65 authentication service 633.

Figure 7:
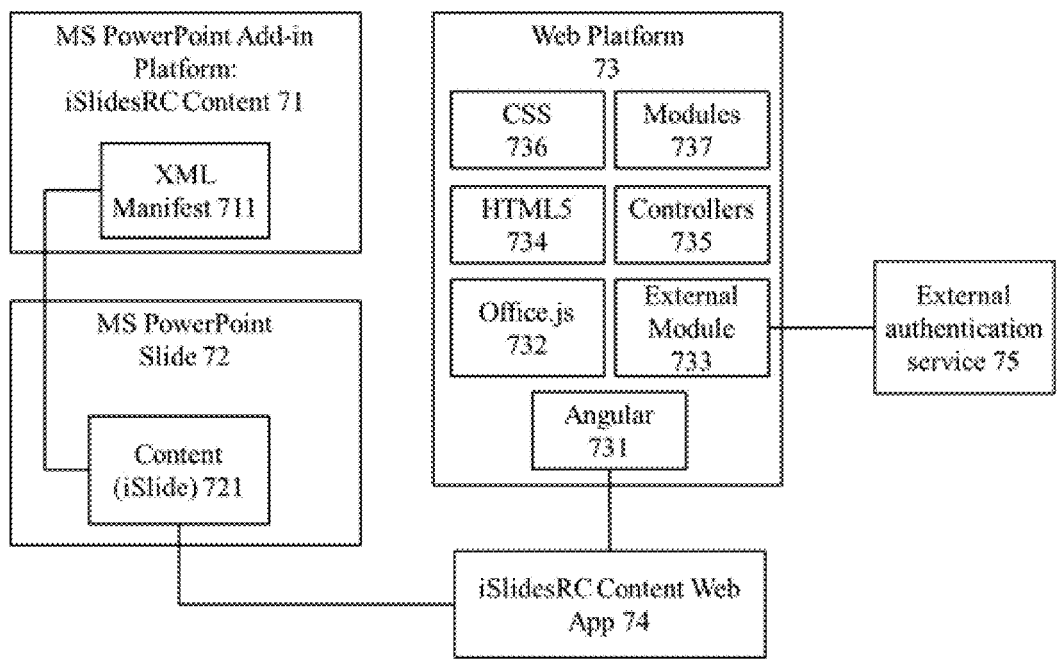
FIG. 7 is a block diagram describing the Content Web Add-ins for POWERPOINT system internal components structure.

FIG. 7 is the Add-ins Content system 71 that consists of the XML Manifest 711 and the Content Web App 74, which manages iSlides (interactive slides). The Manifest defines web content insertion, that is, iSlide content 721 into a MS POWERPOINT slide 72. The Web App content (iSlide) is available as a Web platform 73, which uses Angular framework 731 and web technologies, including HTML5 734, CSS 736, Controllers 735, Modules 737, JavaScript Framework for Office, Office.js 732, and the connection module 733 for the use of an external authentication service 75.

Figure 8:
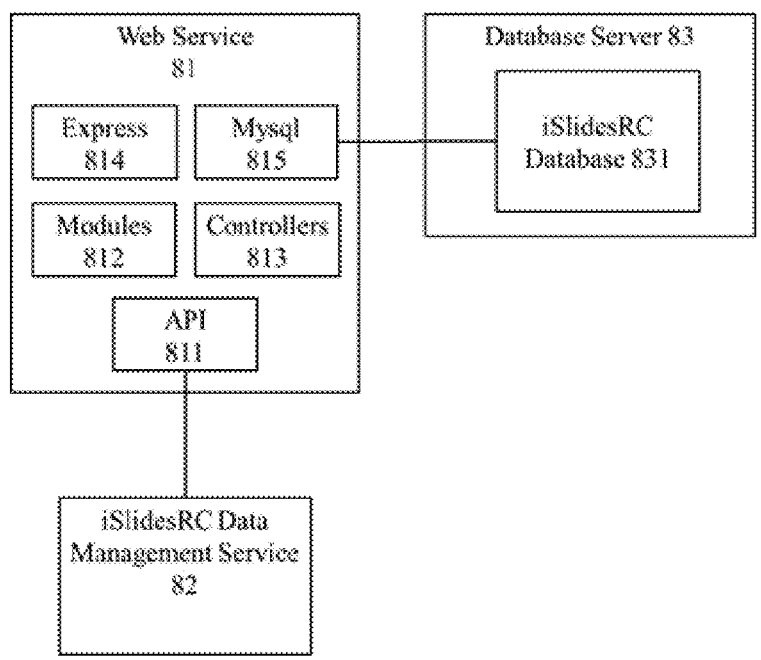
FIG. 8 is a block diagram describing the Data Management Service system internal components structure.

FIG. 8 is the data management service 82 corresponds to a Web service 81 that operates over Node.js using the Express modules 814 to enable the web server and Mysql 815 to establish communication with the database 831 available on the Database Server 83. Management service capabilities are available through the API 811, which is a representational state transfer (REST), and is implemented by Module 812 and Controller 813 resources.

Figure 9:
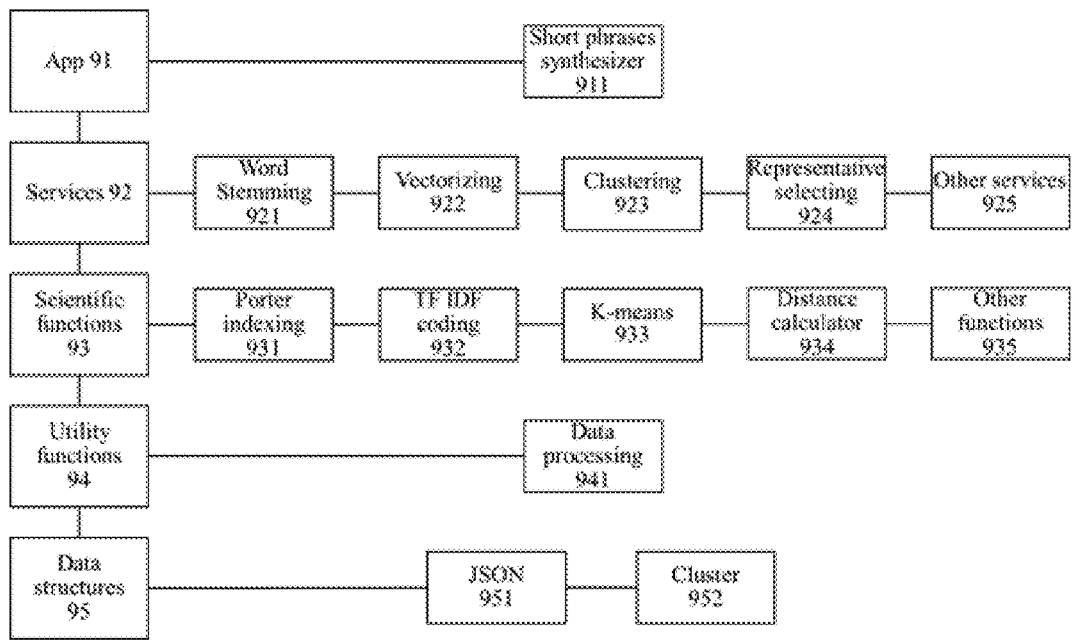
FIG. 9 is a block diagram describing the Data Processing Service layers.

FIG. 9 is a block diagram of the data processing service layers. Top down, the data processing service has five layers: application 91, services 92, scientific functions 93, utility functions 94, and data structures 95. The application layer is the short phrases synthesizer 911, which receives an array of several short phrases and a k number of clusters to synthesize the array. It returns k phrases, each representing the k clusters. The services layer has five services at least. The stemming service 921 that lemmatize the array words; the vectorizing service 922 that codes words with numbers; the clustering service 923 that groups phrases by code recurrences; the representative selecting 924 that picks a phrase representing the cluster; and other processing services such as statistical or other numerical computations. The scientific functions are the service layer core algorithms that perform the actual processing. It includes the Porter indexing (Porter, 2006) 931 to stem words, the TF IDF (term frequency—inverse document frequency) (Manning, 2008) 932 to code words, the K-means algorithm (Arthur, 2007) 933 for phrase similarity grouping, the phrase's nearest distance to a centroid 934 to select the group representative, and other scientific functions 935 to carry out numerical computations such as statistical and other. The utility function has the data processing function 941 that puts together the results of previous scientific calculations. The data structures layer has at least two structures: JSON 951 that packs data arrays and cluster 952 that contains an array of short phrases.

Figure 10:
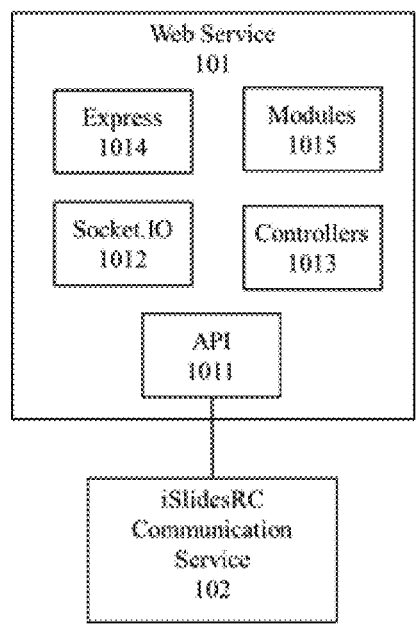
FIG. 10 is a block diagram describing the Communication Service system internal components structure.

FIG. 10 is a block diagram describing the Communication Service system internal components structure. The Communication Service 102 corresponds to a Web service 101 that works over Node.js using the Express modules 1014 to enable the web server and Socket.IO 1012 as a communication protocol to establish connections with clients (iSlidesMobile, iSlides add-in functionalities, iSlides add-in content). The capabilities of the service are exposed by the communication API 1011, which is implemented by Modules 1015 and Controllers 1013 resources.

The Methods

The iSlidesMobile methods will work if, first, iSlidesMobile App (software application) is installed in presenters and audience mobile devices, either they have android or iOS operation systems. Second, POWERPOINT presentation software and Functionalities iSlides Add-ins Web and Contents iSlides Add-ins Web are in the presenter' desktop or laptop system. Third, presenter and audience have Internet connections to interchange mobile devices messages with POWERPOINT Slide Show mode.

Figure 21:
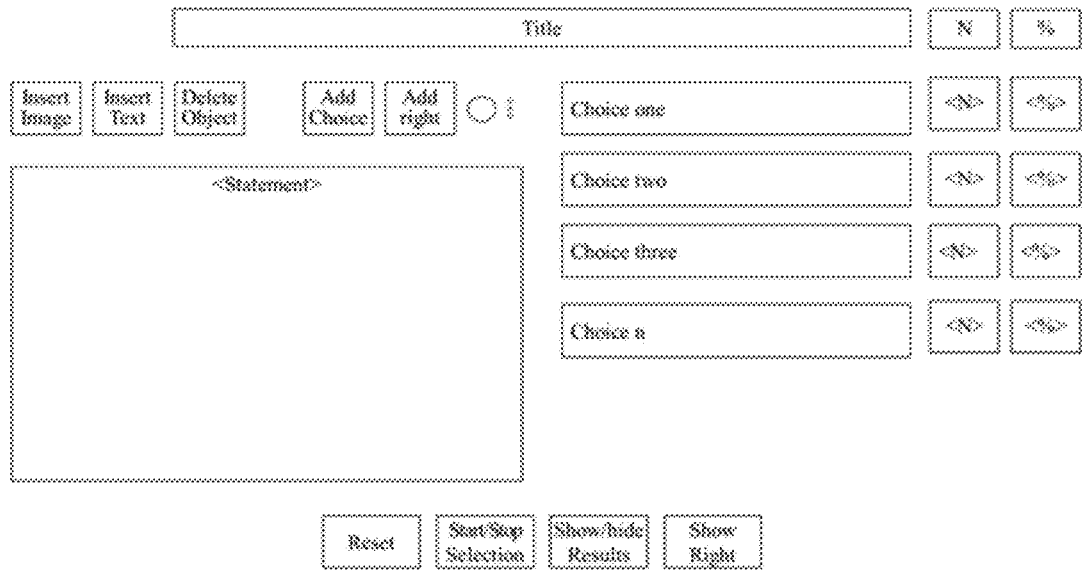
FIG. 21 is iSlidesMobile audience participation in survey response sending event diagram.

There are two methods associated to iSlidesMobile when used by POWERPOINT Slide Show presenters and one method associated to iSlidesMobile when used by POWERPOINT Slide Show audiences. The first method allows the presenter to control the POWERPOINT Slide Show presentation from a mobile device. The second method allows the presenter to design and execute interactive events with the audience, who participate sending messages from their mobile devices to the POWERPOINT Slide Show mode. The presenter methods are described from FIG. 11 to FIG. 13, FIG. 16, and FIG. 19. Audience method is described in FIG. 11, FIG. 12, FIG. 14, FIG. 18 and FIG. 20. While FIG. 15, FIG. 17 and FIG. 21 are illustrations of how POWERPOINT Slide Show mode shows contributions from audience members mobile devices.

Figure 11:
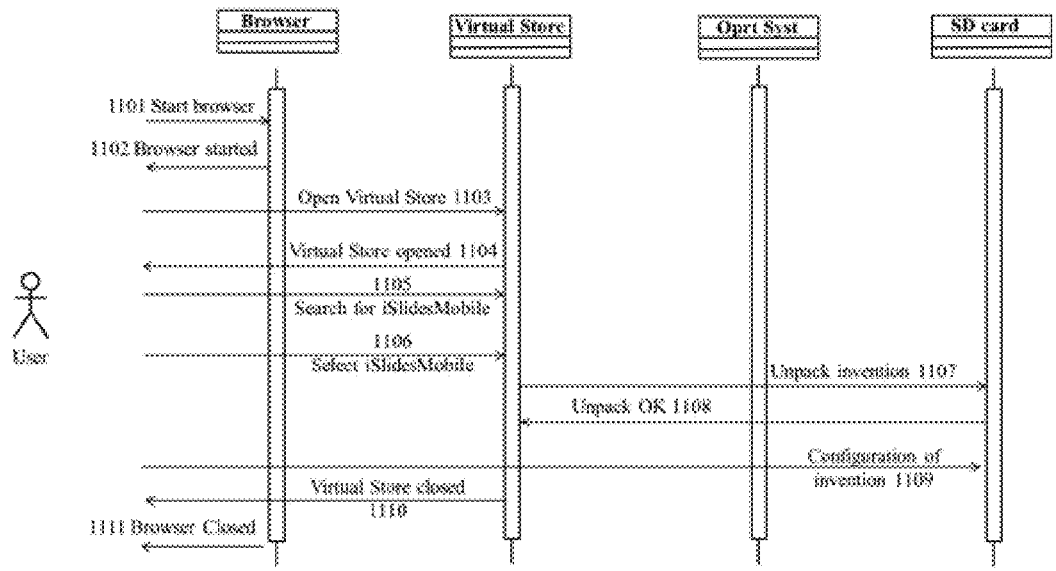
FIG. 11 is an UML sequence diagram to install iSlidesMobile for either presenter or audience mobile devices.

FIG. 11 is an UML sequence diagram to install iSlides-Mobile for either presenter or audience mobile devices. It starts by these users starting a browser 1101 and getting it on screen 1102. The users then open a virtual store (i.e., Google Play or Apple Store) 1103 and one of their home pages opens 1104. Next users search for the iSlidesMobile App 1105, once found, it is selected for installation 1106. Though the mobile device operating systems, the iSlidesMobile App is unpacked into the device's SD card 1107. Once unpacked 1108 and through the operating system, users may configure the iSlidesMobile App 1109. Finally, the virtual store 1110 and browser 1111 may be closed.

Figure 12:
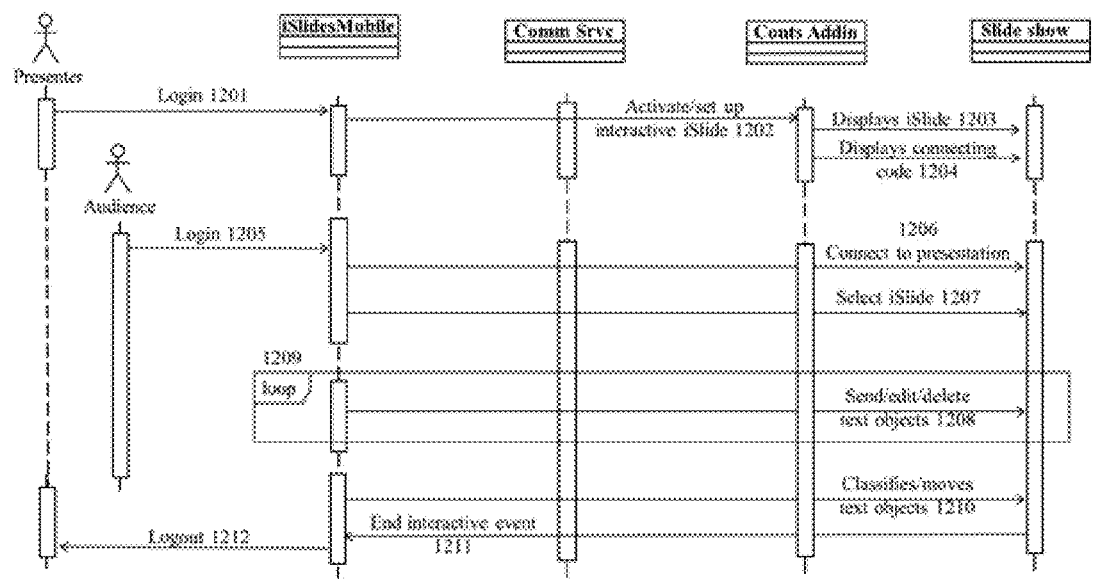
FIG. 12 is UML iSlidesMobile execution UML sequence diagram describing how presenter and audience collaboratively perform and interactive event in POWERPOINT Slide Show mode.

FIG. 12 is an UML iSlidesMobile execution UML sequence diagram describing how presenter and audience collaboratively perform and interactive event in POWERPOINT Slide Show mode. It starts with the presenter login in its mobile device iSlidesMobile App 1201 and activating an iSlides in the desk top computer, through the Contents Add-ins Web in POWERPOINT and setting up a predesigned interactive event 1202. Then, the iSlides Contents Add-in Web displays the interactive event in POWERPOINT Slide Show mode to the audience 1203 and the connection code is displayed 1204. At any previous moment, the audience logged in their iSlidesMobile App 1205 and inserted the connecting code 1206. The audience select, from the slide sorter on their mobile device screen, the interactive event iSlide 1207 and begin sending/editing/deleting text objects to POWERPOINT Slide Show mode 1208; they can repeat this action as many time as they desire or have time to do it 1209. The presenter may move to reorder the text objects 1210. Next, the presenter ends the interactive event 1211 and move on the presentation or logout from the iSlidesMobile App 1212.

Figure 13:
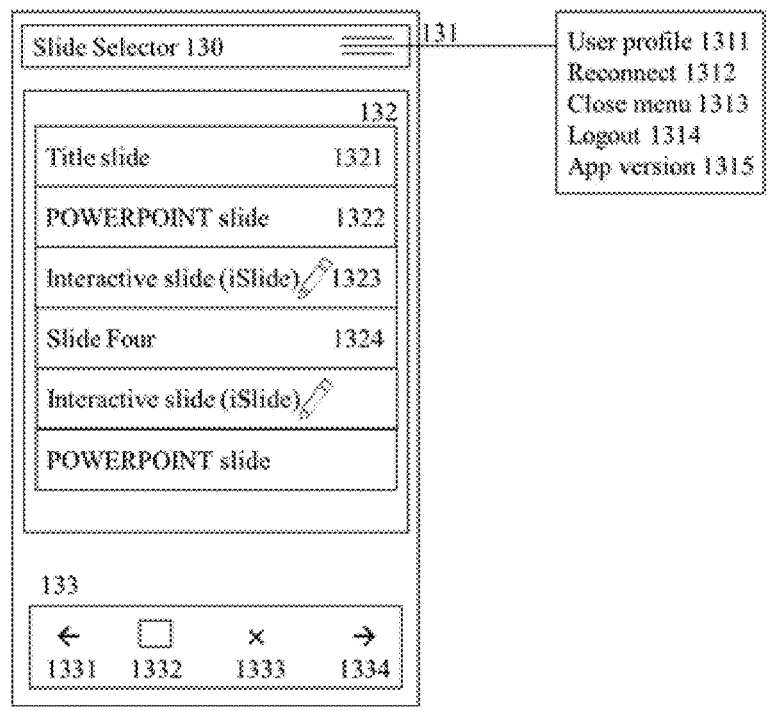
FIG. 13 is iSlidesMobile presenter presentation control functionality diagram.

FIG. 13 is an iSlidesMobile presenter touch screen functionalities block diagram. These functionalities allow the presenter to control POWERPOINT Slide Show mode from a mobile device. The diagram shows three distinctive sectors: The Slide Selector 130, as the title to the functionalities available, and a menu to access to App functions 131; the slides pane 132 and the presentation control touch buttons 133. The menu gives access to information about the user profile 1311, reconnection facility 1312, close menu to exit it 1313, logout to leave the App 1315, and information about the App version 1315.

The Slide pane is a facsimile that displays the titles of all slides in the presentation. The first, in the scheme, is a typical POWERPOINT presentation title slide 1321; next, there is a conventional POWERPOINT bullet slide 1322; the following slide is an interactive iSlide and is distinguished by a pencil icon, representing its sending, editing, and deleting capabilities in POWERPOINT Slide Show mode 1313; if a slide has no title, it is shown with its position number 1324. Access to the slide is gained through touching on its title. The presentation control buttons allow the presenter to start presentation 1332 and end presentation 1333. The presenter can also advance slides forward 1334 and backward 1331. Additionally, the presenter may jump forward and backward from one slide to another that is not next to it.

The audience Slide Selector version does not include the functionalities to control the presentation.

The contents iSlides Add-ins Web include several iSlides that manage text objects, such as sticky notes. All these receive audience contributions in a similar way.

Figure 14:
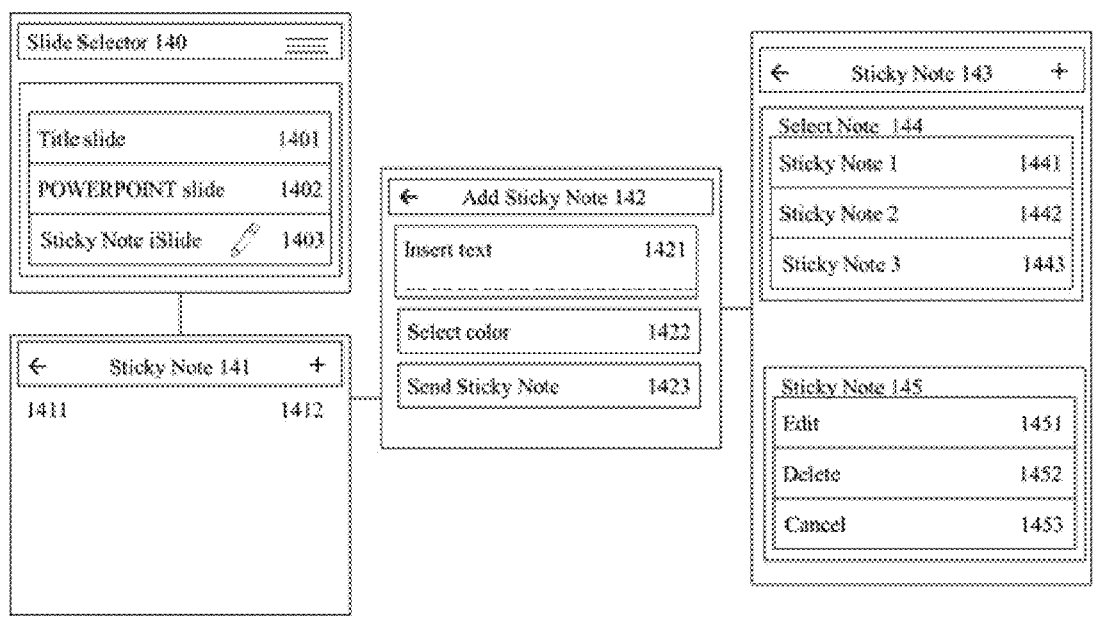
FIG. 14 is a block diagram of how audience members contribute to sending, editing, and deleting text objects into POWERPOINT Slide Show mode through iSlidesMobile App from their mobile devices.
Figure 15:
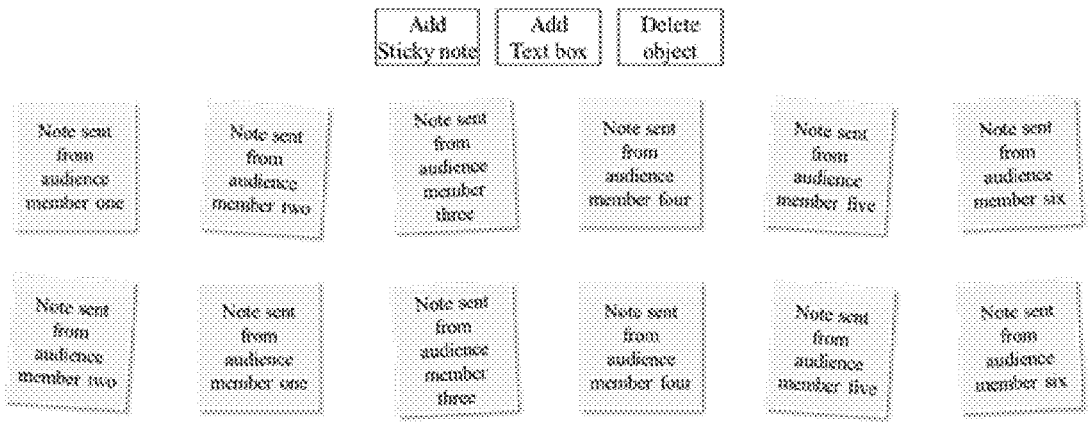
FIG. 15 is a schematic view of the Sticky notes brainstorm in POWERPOINT Slide Show mode.

FIG. 14 is a block diagram of how audience members contribute to the sending, editing, and deleting text objects into POWERPOINT Slide Show mode through iSlidesMobile App from their mobile devices. Once the presenter launches an interactive iSlide to POWERPOINT Slide Show mode, such as a Sticky Note iSlide and displays the connection code, audience members may activate their iSlidesMobile App. After authentication, the Slide Selector 140 is shown on the mobile's screen. Among other POWERPOINT slides, a sticky note iSlide is displayed with its distinctive pencil icon 1403. If the iSlide is emphasized on the mobile screen means that the iSlide is displayed in POWERPOINT slideshow mode and can be remotely accessed from the mobile device. Touching on the sticky note highlighted iSlide give access to Sticky Note editor 141, which has on its left an arrow to return to Slide Selector and a + sign to enter the Add Sticky Note dialog 142. Inserting the text for the note is mandatory 1421, while selecting sticky note color is optional 1422. The button Send Sticky Note 1423 remotely sends the sticky to POWERPOINT Slide Show mode. Sent sticky notes are listed on the audience member mobile device screen 144, in their selected colors. Touching on any of them opens a sticky note menu 145 to edit 1451, delete 1452 or cancel the action 1453. If editing is selected, an Edit Sticky Note dialog open 146. The text to be edited is shown 1461 and the keyboard is activated. Color can also be changed 1462. Pressing Save Changes 1463 updates sticky note contents in POWERPOINT Slide Show mode.

There are several interactive slides (iSlides) available with the POWERPOINT content Add ins Web that may receive text object from the audience mobile devices. FIG. 15 illustrates how POWERPOINT Slide Show mode shows audience contributions from their mobile devices on a Sticky note iSlides.

Figure 16:
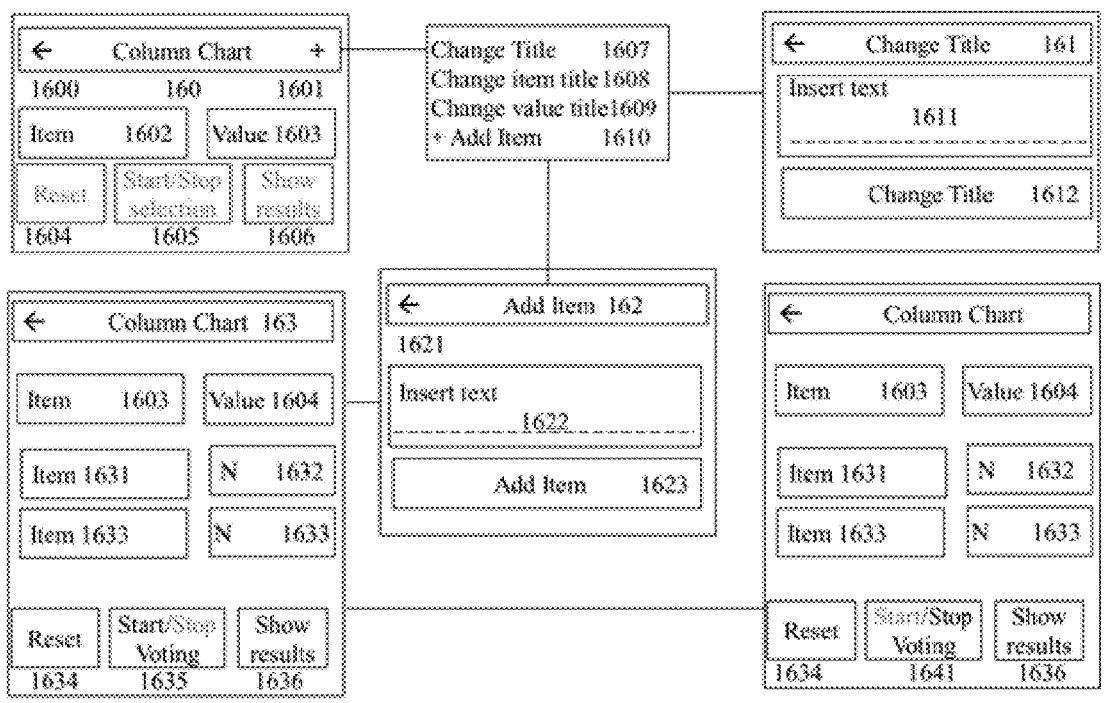
FIG. 16 is iSlidesMobile presenter poll event design and activating diagram.
Figure 17:
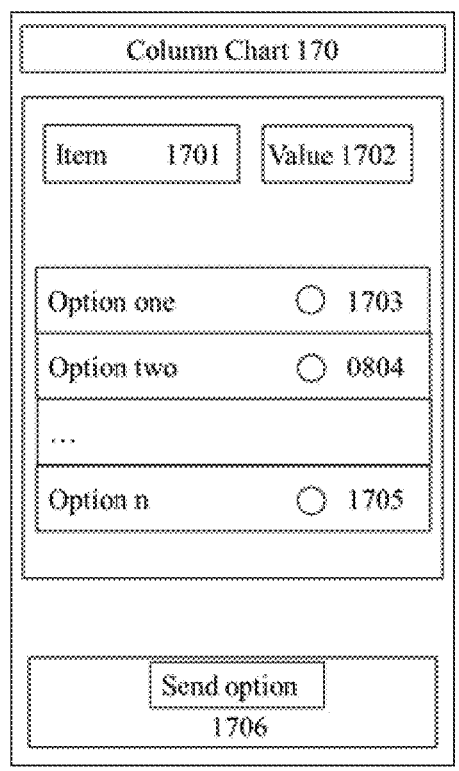
FIG. 17 is iSlidesMobile audience poll sending functionality diagram.

FIG. 16 is an iSlidesMobile presenter setup and starting poll event diagram. The example chosen to illustrate the iSlidesMobile poll capabilities is the column chart iSlide. Once the interactive slide is inserted into POWERPOINT design panel through the Add-ins Web, presenters may set it up via desktop or iSlidesMobile App. If they use the App, they must launch to POWERPOINT Slide Show mode from the presentation control buttons at the Slide Selector lower sector. Then select the Column Chart iSlide and arrive to the Column Chart interface 160. It has the arrow backwards 1600 to return to the Slide Selector and a sign '+' 1601 to start its configuration. Bellow there are two headers: Item 1602 or what is voted and Value 1603 or the number of votes for this example. Controls to manage the activity appear dimmed at the screen bottom to Reset 1604 the activity, Start/Stop voting 1605 the choice, and Show results 1606. Pressing the plus sign opens a menu to Change Title 1607, give a name to item 1608, give a name to value 1609 and Add Item 1610. Selecting Change Title 1607, or Change item title 1608, or Change value title 1609 have a similar dialog to the Change Title 161 dialog shown, where a text box prompts its insertion 1611. Pressing Change Title sends the new text to POWERPOINT Slide Show mode. Selecting the Add item 1610 from the menu, a Add Item 162 dialog opens. It has the arrow backwards 1621 to return to the Column Chart 160 menu. It also has an insert text box 1622 and the Send Item button 1623 that sends the text to POWERPOINT Slide Show mode. After completing the list of items, the Column Chart panel 163 shows the list 1603 to 1633. The interactive event may be launched by pressing Start Voting 1635 and voting becomes available in audience members mobile devices. The voting is active until the Stop Voting button 1636 is pressed and results may be shown to the audience pressing Show results 1636.

FIG. 17 is an iSlidesMobile audience participation in vote sending event diagram. Once the presenter starts the interactive event, audience members may enter to the Column Chart dialog 170 from their mobile device Slide Selector. Item 1701 and Value 1702 instances appear under the heading. Options for audience voting 1703 to 1705 are also shown, with a round icon to mark the option. Finally, pressing the Send option button sends the option Web to be shown in POWERPOINT Slide Show mode.

Figure 18:
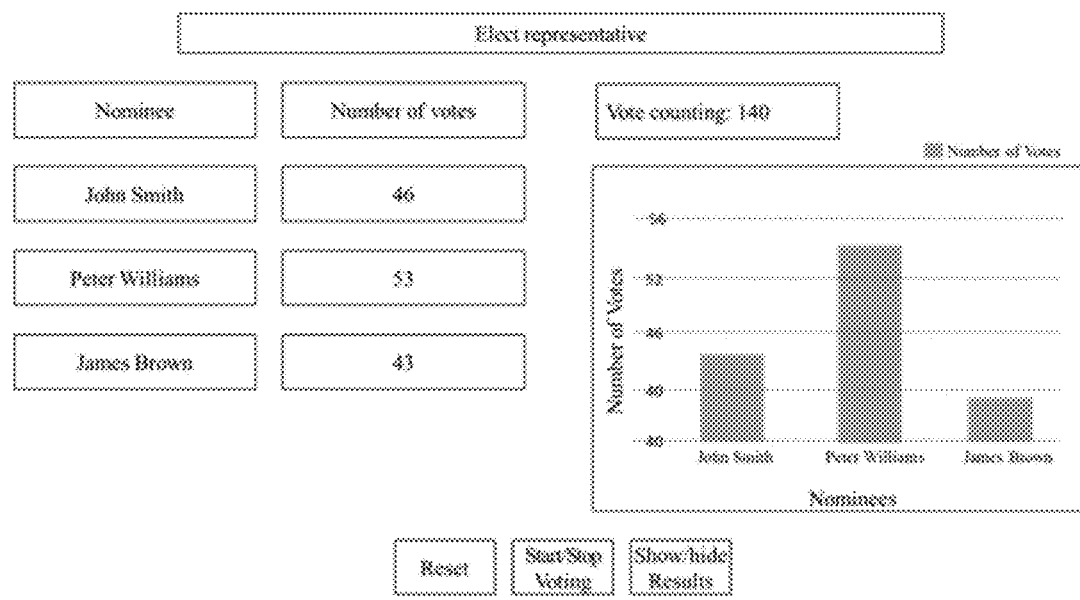
FIG. 18 is a block diagram of the POWERPOINT Slide Show mode displaying audience vote participation from mobile devices.

FIG. 18 is a schematic view of the polling activity results displayed in POWERPOINT Slide Show mode, names and numbers are fictitious.

Figures 19, 20:
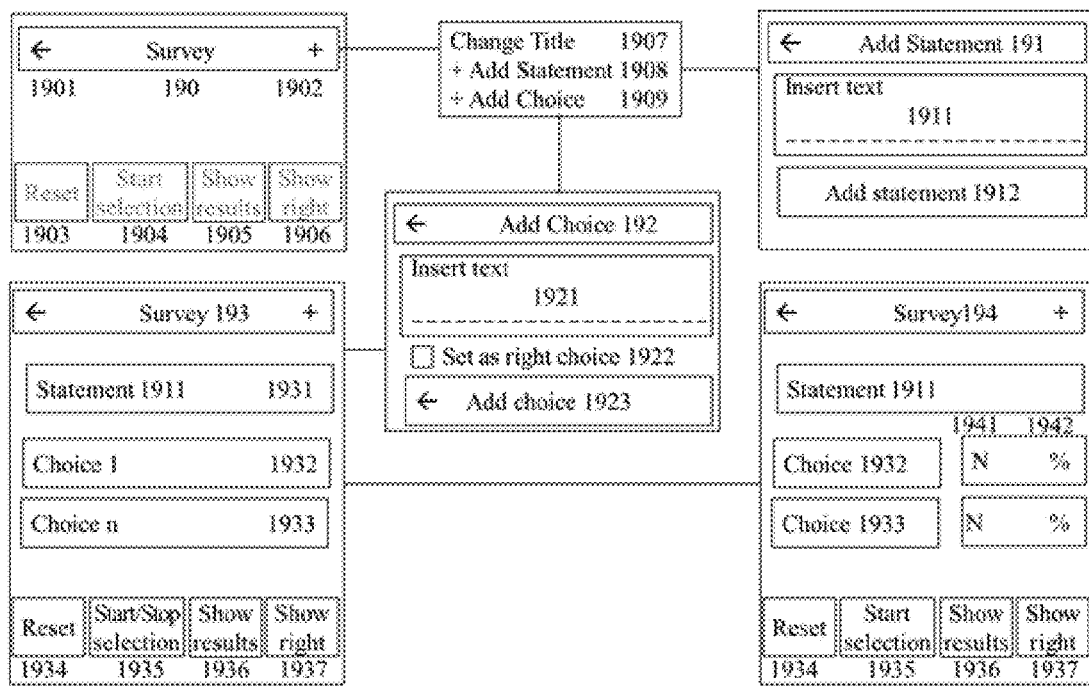
FIG. 19 is iSlidesMobile presenter survey interactive event design and activation diagram.
FIG. 20 is a block diagram of the POWERPOINT Slide Show mode displaying FIG. 19's survey interactive event results.

FIG. 19 is an iSlidesMobile presenter survey interactive event setup diagram. Once a survey iSlide type is inserted into POWERPOINT design mode to support an interactive event, its setup may be carried out from either desktop or mobile device, through the iSlidesMobile App. If the latter was selected, the POWERPOINT Slide Show may be launched directly from the mobile device through the control buttons 133 and the survey iSlide selected from the Slide Selector 130. The Survey initial menu 190 shows an arrow backwards 1901 to return to the Slide Selector and a sign '+' 1902 to start its configuration. Controls to manage the activity appear dimmed at the screen bottom to Reset 1903 the activity, Start selecting 1904 the choice, Show results 1905, and show the right 1906 choice. Pressing the plus sign opens a menu to Change Title 1907, Add Statement 1908 to put the choice selection under context, and choice 1909 to complete the setup. The Add Statement menu 191 has the backward arrow to go back and a text area to insert the statement 1911. The Send Statement button 1912 sends it to POWERPOINT Slide Show mode. The Add Choice menu 192 has the backward arrow to go back as well as an area to insert the choice 1921 and a select box for it is the right choice 1922. The Send Choice button 1923 sends it to POWERPOINT Slide Show mode. After all choices are entered, the right one was marked, and returning to the Survey panel 193, the statement 1911 appears, choices are listed, and the interactive event control buttons light up. Reset 1934, Start/Stop selection 1935, Show results 1936, and Show right 1937 are now available. Pressing the Start selection button 1935 begins audience member participation through selecting the perceived choice from their mobile devices. After pressing the Start selection button, its turns red and changes to Stop selection. While audience members select their choice, the presenter's mobile shows the number of answers being responded 1941. Pressing the Stop selection button cancels selecting choice by audience members. Pressing the Show results 1936, numbers and percentages are displayed in POWER-POINT Slide Show mode. Pressing the Show right button enhances in green the correct choice in POWERPOINT Slide Show mode.

FIG. 20 is an iSlidesMobile audience participation in survey response sending event diagram. Once the presenter begins the interactive event, audience members may enter to the survey response dialog 200 from their mobile device Slide Selector. The dialog shows the Statement 2001 and displays the choices available 2002 through 2004, with a round icon to select the choice. Finally, pressing the Send choice button 2005 sends the option to be shown in POWERPOINT Slide Show mode.

FIG. 21 is a schematic view of the Survey response activity displayed in POWERPOINT Slide Show mode.

Figure 22:
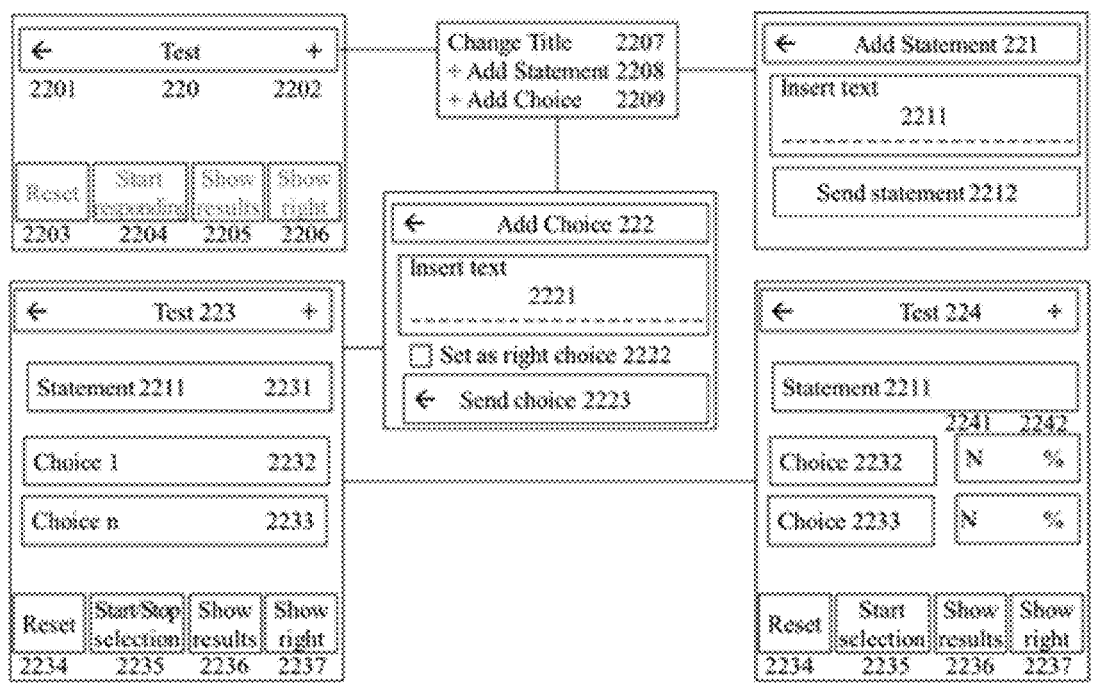
FIG. 22 is iSlidesMobile presenter test interactive event design and activation diagram.

FIG. 22 is an iSlidesMobile presenter Test interactive event setup diagram. Once a Test iSlide type is inserted into POWERPOINT design mode to support an interactive event, its setup may be carried out from either desktop or mobile device, through the iSlidesMobile App. If the latter was selected, the POWERPOINT Slide Show may be launched directly from the mobile device through the control buttons 133 and the Test iSlide selected from the Slide Selector 130. The Test initial menu 220 shows an arrow backwards 2201 to return to the Slide Selector and a sign '+' 2202 to start its configuration. Controls to manage the activity appear dimmed at the screen bottom to Reset 2203 the activity, Start responding 2204, Show results 2205, and Show the right 2206 choice. Pressing the plus sign 2202 opens a menu to Change Title 2207, Add Statement 2208 to put the choice selection under context, and choice 2209 to complete the setup. The Add Statement menu 221 has the backward arrow to go back and a text area to insert the statement 2211. The Send Statement button 2212 sends it to POWERPOINT Slide Show mode. The Add Choice menu 222 has the backward arrow to go back as well as an area to insert the choice 2221 and a select box to mark if it is the right choice 2222. The Send Choice button 2223 sends it to POWERPOINT Slide Show mode. After all choices are entered, the right one was marked, and returning to the Test panel 223, the statement 2211 appears, choices are listed, and the interactive event control buttons light up. Reset 2234, Start/Stop selection 2235, Show results 2236, and Show right 2237 are now available. Pressing the Start selection button 2235 activate audience member participation through selecting the perceived choice from their mobile devices. After pressing the Start selection button, its turns red and changes to Stop selection. While audience members select their choice, the presenter's mobile shows the number of answers being responded 2241. Pressing the Stop selection button cancels selecting choice by audience members. Pressing the Show results 2236, numbers and percentages are displayed in POWER-POINT Slide Show mode. Pressing the Show right button enhances in green the correct choice in POWERPOINT Slide Show mode.

Figure 23:
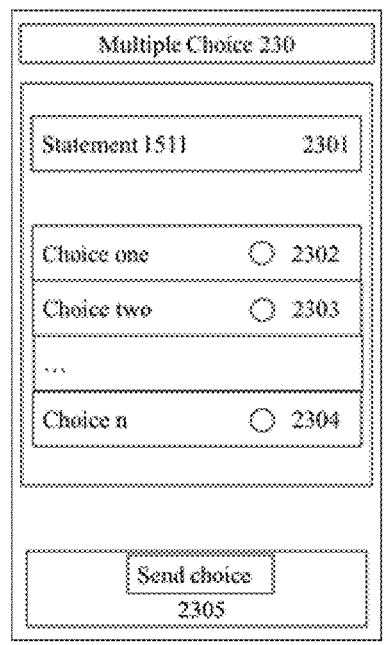
FIG. 23 is a block diagram of the POWERPOINT Slide Show mode displaying FIG. 22's test interactive event results.

FIG. 23 is an iSlidesMobile audience participation in test response sending interactive event diagram. Once the presenter starts the interactive event, audience members may enter to the test response dialog 200 from their mobile device Slide Selector. The dialog shows the Statement 2001 and displays the choices available 2002 through 2004, with a round icon to select the choice. Finally, pressing the Send choice button 2005 sends the option to be shown in POWERPOINT Slide Show mode.

Figure 24:
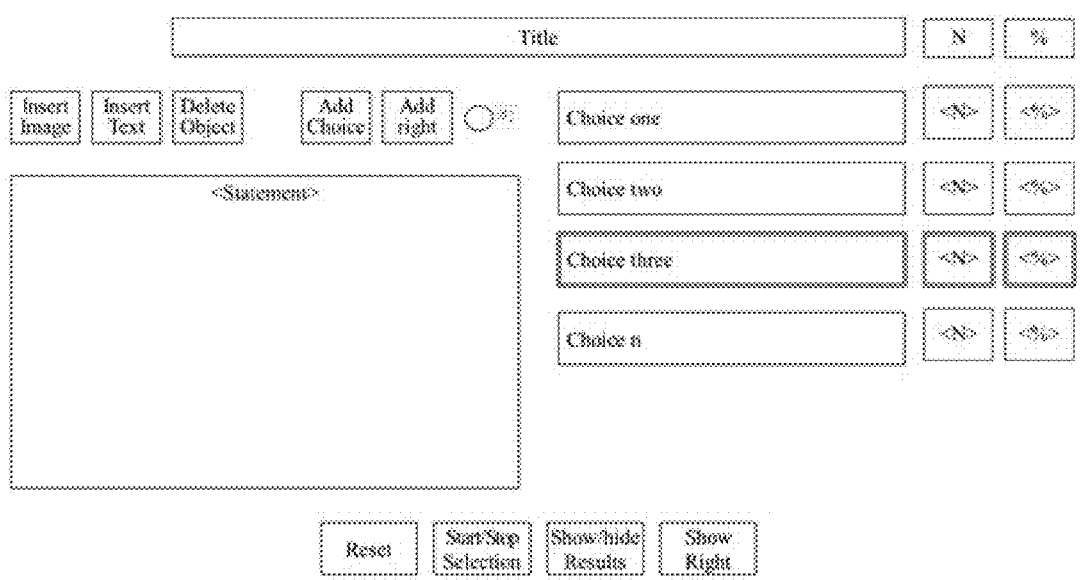
FIG. 24 is iSlidesMobile audience participation in test response sending event diagram.

FIG. 24 is a schematic view of the Test response activity displayed in POWERPOINT Slide Show mode.

What is claimed is:

1. A computer implemented method for manipulating interactive slides (hereinafter also referred to as ISLIDE interactive slides) working in its own website or inserted into a presentation system (hereinafter also referred to as a slideware), using an ISLIDESMOBILE presentation application, from mobile devices, wherein inserted interactive slides reside in a native slideware slide that, when in a slideware slideshow mode, from mobile devices:

a presenter and an audience member can remotely edit an interactive slide inserted in a slideware and in its slideshow mode;

the presenter manages a participation of the audience member in an interactive event or a pre-designed conference of interactive slides, wherein the interactive event comprises at least one of the following three types of interactive events:
  text objects (including sticky notes and business model canvas);
  short texts (including brainstorming and questions); and
  polls, surveys, and tests;
the audience member attending a meeting, a class/lecture, a conference may participate in the three types of interactive events through the following steps:
  send, edit and delete text objects, as well as change a color of text objects;
  send, edit and delete short texts, if their number exceeds a screen display capacity, before viewing, short texts are grouped with machine learning algorithms; and
  select and send values that are processed arithmetically or statistically before displaying results;
wherein the method further comprises the steps of:
  installing the presentation application in a memory of a mobile device of the presenter and in a memory of a mobile device of at least one audience member, wherein the presentation application is used to manipulate interactive slides inserted in the slideware from mobile devices;
  starting a presenter session from a mobile device with the presentation application to manipulate interactive slides from mobile devices;
  displaying, through an interactive slide add-in, an interactive event in the slideware slideshow mode and a connection code for audience connection;
wherein
i. the at least one audience member logs into the presentation application to manipulate, from mobile devices, the interactive slides inserted into the slideware and enters the connection code;
ii. the at least one audience member selects the interactive event, from a slide sorter on a screen of their mobile device, and starts sending, editing, or deleting text objects in the slideware slideshow mode; and
iii. the presenter ends the interactive event, from mobile devices, continues with a slideware presentation that may include other interactive slides inserted in a presentation system, or logs out from the presentation application.

2. The method according to claim 1, wherein the installing of the ISLIDESMOBILE presentation application in the mobile device memory of the at least one audience member and in the mobile device memory of the presenter comprises:
  launching and displaying a browser on screen;
  opening a virtual store and home pages of the virtual store;
  searching for the ISLIDESMOBILE presentation application;
  selecting install;
  unpacking the ISLIDESMOBILE presentation application on a SD card; and
  configuring the ISLIDESMOBILE presentation application.

3. The method according to claim 1, wherein the presenter can remotely control a presentation of the slideware, through starting the presentation, moving, and skipping slides back and forth, and ending the presentation;
  wherein the slideware is selected from the group consisting of ISLIDE interactive slides working independently in a website, POWERPOINT presentation system, GOOGLE SLIDES presentation system, PREZI presentation system, and KEYNOTE presentation system.

4. The method according to claim 1, comprising enabling presenters and audiences with several ISLIDE interactive slides projected directly on the slideware slideshow mode, wherein the ISLIDE interactive slides are selected from the group consisting of "Sticky notes", "Brainstorming", "Hexagon", "Speech bubbles", "Causes and Effects", "Comparisons by Categories", "Business Model Canvas", polls, surveys, and tests.

5. The method according to claim 1, comprising enabling mobile devices with remote features available for presenters to configure, send, edit, and delete text objects in ISLIDE interactive slides directly on the slideware slideshow mode.

6. The method according to claim 1, wherein the presenter has the facility to start and end participation of the at least one audience member to send, edit and delete their own text objects in ISLIDE interactive slides directly on the slideware slideshow mode.

7. The method according to claim 1, wherein when the number of contributions from the at least one audience member exceeds the slideware display capabilities, further comprising the presenter activating a data processing to both group text objects by affinity and show group representatives directly on the interactive slide on slideware slideshow mode.

8. The method according to claim 1, comprising making available to the at least one audience member an option of sending text objects to the ISLIDE interactive slide that is on the slideware slideshow mode, if the presenter has a text objects interactive slide on the slideware slideshow mode.

9. The method according to claim 1, wherein the at least one audience member is enabled to edit and delete their own text objects already sent to the ISLIDE interactive slide that are on the screen on the slideware slideshow mode.

10. The method according to claim 1, comprising giving access, to the presenter and the at least one audience member, to edit several ISLIDE interactive slides of a survey type projected directly on the slideware slideshow mode, and results shown in Column or Pie charts.

11. The method according to claim 10, wherein if the presenter has an interactive survey slide on the slideware slideshow mode, the at least one audience member send their responses to the iSlide that is on the slideware slideshow mode screen.

12. The method according to claim 11, wherein the presenter displays the responses of the at least one audience member in terms of a sum of responses and their percentages.

13. The method according to claim 1, wherein if the presenter has a test-type ISLIDE interactive slide in the presenter's slideware presentation, the presenter's remote mobile device is available for the presenter to configure or design the test-type ISLIDE interactive slide.

14. The method according to claim 13, wherein the presenter activates, pauses, and deactivates participation of the at least one audience member to send test responses in ISLIDE interactive slides directly on the slideware slideshow mode.

15. The method according to claim 1, wherein the at least one audience member enters to participate in any type of test of an ISLIDE interactive slide that is shown on the slideware slideshow mode if it appears highlighted and marked with a pencil in an ISLIDESMOBILE presentation application slide selector of the at least one audience member.

16. The method according to claim 1, wherein if the presenter has an interactive survey slide on slideware slideshow mode, the at least one audience member also has an option to send survey responses to the ISLIDE interactive slide located on the screen on the slideware slideshow mode.

17. The method according to claim 16, wherein once the at least one audience member has sent their survey responses, the presenter shows the survey responses of the at least one audience member in terms of a sum of responses and percentages, highlighting a correct answer.

18. The method according to claim 1, wherein on the slideware slideshow mode, options are displayed for the at least one audience member to "start" and "finish" sending text objects.

19. The method according to claim 18, wherein the options include sending or superimposing grouped texts on the ISLIDE interactive slide on the slideware slideshow mode.

20. The method according to claim 1, wherein because the ISLIDESMOBILE presentation application must be loaded and activated on the mobile device of the at least one audience member in order for the at least one audience member to send text objects to the ISLIDE interactive slide text object on the slideware slideshow mode, the at least one audience member has options to add an object, type the text, select, or change a color, and submit the text object.

21. The method according to claim 1, wherein for the presenter to configure survey-type ISLIDE interactive slides on the slideware slideshow mode, the presenter performs the following steps:

have active at least one survey type ISLIDE interactive slide in the slideware;
remotely start the slideware presentation; and
configure the survey-type ISLIDE interactive slides through:
adding question,
changing survey title,
changing question label,
updating scale.

22. The method according to claim 21, wherein changing one of the options comprises:
select the option,
a text box requests the insertion of text;
send a new label of the selected option to the survey ISLIDE interactive slide on the slideware slideshow mode.

23. The method according to claim 21, wherein all changes to ISLIDE interactive slides made from mobile devices are saved within a native file of the slideware.

24. A system to run the ISLIDESMOBILE presentation application according to the method of claim 1, wherein the system comprises:
a mobile device with the ISLIDESMOBILE presentation application installed;
a computer with an operating system, slideware and the ISLIDESMOBILE presentation application installed;
three Internet cloud data management, processing, and communication services.

* * * * *